(12) United States Patent
Tsujimoto

(10) Patent No.: US 6,275,661 B1
(45) Date of Patent: *Aug. 14, 2001

(54) APPARATUS ADAPTED FOR FILM HAVING MAGNETIC RECORDING PART

(75) Inventor: Shinichi Tsujimoto, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 39 days.

(21) Appl. No.: 09/045,080

(22) Filed: Mar. 20, 1998

(30) Foreign Application Priority Data

Mar. 26, 1997 (JP) .................................................... 9-073234
Mar. 12, 1998 (JP) .................................................. 10-061240

(51) Int. Cl.$^7$ ............................... G03B 17/24; G03B 1/00
(52) U.S. Cl. ......................... 396/319; 396/418; 396/539
(58) Field of Search .................................. 396/310, 312, 396/319, 320, 539, 418; 360/126, 137

(56) References Cited

U.S. PATENT DOCUMENTS 5,307,100 * 4/1994 Kubo ..................................... 396/319
5,857,123 * 1/1999 Miyamoto et al. .................. 396/319

FOREIGN PATENT DOCUMENTS 7209733    8/1995  (JP) ............................. G03B/17/24
8160521    6/1996  (JP) ............................. G03B/17/24

OTHER PUBLICATIONS

English abstract of Japanese Laid–open Patent Appln. No. Hei 7–209733, Aug. 11, 1995.

English abstract of Japanese Laid–open Patent Appln. No. Hei 8–160521, Jun. 21, 1996.

* cited by examiner

Primary Examiner—David M. Gray
(74) Attorney, Agent, or Firm—Robin, Blecker & Daley

(57) ABSTRACT

An apparatus, such as a camera, adapted for a film having a magnetic recording part, includes a magnetic head which reads information from the magnetic recording part of the film, a motor, a first shield member which shields the magnetic head from magnetic noise generated by the motor, and a second shield member which shields the magnetic head from magnetic noise generated by the motor and has a characteristic different from that of the first shield member. The second shield member is disposed closer to the magnetic head than the first shield member and on a front side of the magnetic head.

19 Claims, 6 Drawing Sheets

APPARATUS ADAPTED FOR FILM HAVING MAGNETIC RECORDING PART

BACKGROUND OF THE INVENTION

1. Field of the Invention

The present invention relates to an apparatus such as a camera adapted for a photographic film having a magnetic recording part, and more particularly to measures against magnetic noise applied to a magnetic head of the camera.

2. Description of Related Art

The photographic film of the kind having a magnetic recording layer formed on the base surface side thereof has become practically usable. A camera arranged to magnetically record information of varied kinds at each of photo-taking frames of the film of the above-stated kind was disclosed in U.S. Pat. No. 4,878,075, etc. For the photographic film of this kind, another camera has been developed to have a reloading function. According to the reloading function, in a case where the film has been reloaded on the same or some other camera after the use of the film is suspended by rewinding the film halfway before it is completely used, magnetic information recorded on the film is read by a magnetic head (magnetic reading means) disposed within the camera, so that a photo-taking operation on the same film from an unexposed (unused) frame part thereof can be resumed automatically.

In the meantime, the magnetic recording layer of the photographic film is formed to cover the whole film including photo-taking areas. However, the magnetic material of the magnetic layer is applied to the film in a very small quantity so as to prevent any adverse effect on picture quality. Therefore, the filling rate of the magnetic material is very small to give only a very small output of the magnetic head in reading the magnetic information recorded on the film.

It is, on the other hand, important for the magnetic reading device of a camera using the photographic film of the above-stated kind, to be compact in size. With the magnetic reading device compactly arranged within the camera, however, a magnetic noise generating source, such as a film transport motor, is disposed close to the magnetic head of the magnetic reading device. In many cases, the magnetic noise generating source thus imparts an induced noise component to the reading output of the magnetic head. As a result, the S/N ratio of the reading output is deteriorated to hinder the magnetic information from being accurately read by the magnetic reading device.

Cameras of the kind having the above-stated film reloading function are mostly arranged to make a check for the presence or absence of the record of magnetic information for every one of photo-taking frames and to determine each frame to be "exposed" when the frame is found to have the magnetic information. However, in a case where the induced noise component is large as compared with the reading output expected, detection of such a large induced noise component tends to cause an unexposed frame to be mistaken for an exposed frame. In such a case, the film reloading function cannot be adequately carried out.

To solve this problem, an arrangement has been proposed as disclosed in Japanese Laid-Open Patent Application No. HEI 4-22937, in which in order to lessen the adverse effect of an induced noise due to a film transport motor, a magnetic head is disposed in a specific direction with respect to the rotating shaft of the motor, because magnetism generated by the motor becomes less in that specific direction.

In connection with the above-stated problem, another arrangement has been proposed as disclosed in Japanese Laid-Open Patent Application No. HEI 5-34798, in which magnetism coming from a film transport motor is lessened by encompassing the motor with a magnetic shield member which is made of a suitable material. In the case of this disclosure, a soft magnetic material such as permalloy is employed as the magnetic shield member.

Another method has been proposed as disclosed in Japanese Laid-Open Patent Application No. HEI 4-32036, as a solution of the above-stated problem. According to this method, the adverse effect of magnetism coming from a motor is lessened by arranging a magnetic shield member either in front or in rear of a magnetic head.

A further method has been proposed as disclosed in connection with this problem in Japanese Laid-Open Patent Application No. HEI 6-332064. According to that method, an adverse effect of a leakage magnetic flux from a film transport motor on magnetic information recorded on the film is prevented by making, from a magnetic material, a film take-up spool with which to encompass the film transport motor.

However, these prior methods have presented the following problems. The induced noise generated at the magnetic head by the film transport motor cannot be sufficiently removed. In order to sufficiently attain the effect of these methods, the shield member must be arranged to have a large thickness and also to have a large area. However, such arrangement results in an increase in size of the magnetic reading device.

BRIEF SUMMARY OF THE INVENTION

In accordance with one aspect of the invention, there is provided an apparatus, such as a camera, adapted for a film having a magnetic recording part, which comprises a magnetic head which reads information from the magnetic recording part of the film, a motor, a first shield member which shields the magnetic head from magnetic noise generated by the motor, and a second shield member which shields the magnetic head from magnetic noise generated by the motor and has a characteristic different from that of the first shield member, the second shield member being disposed closer to the magnetic head than the first shield member and on a front side of the magnetic head, so that adverse effects of magnetic noise of the motor on the magnetic head can be effectively removed with a compact structure.

The above and other aspects and features of the invention will become apparent from the following detailed description of embodiments thereof taken in connection with the accompanying drawings.

DETAILED DESCRIPTION OF THE INVENTION

Hereinafter, preferred embodiments of the invention will be described in detail with reference to the drawings.

Figure 1:
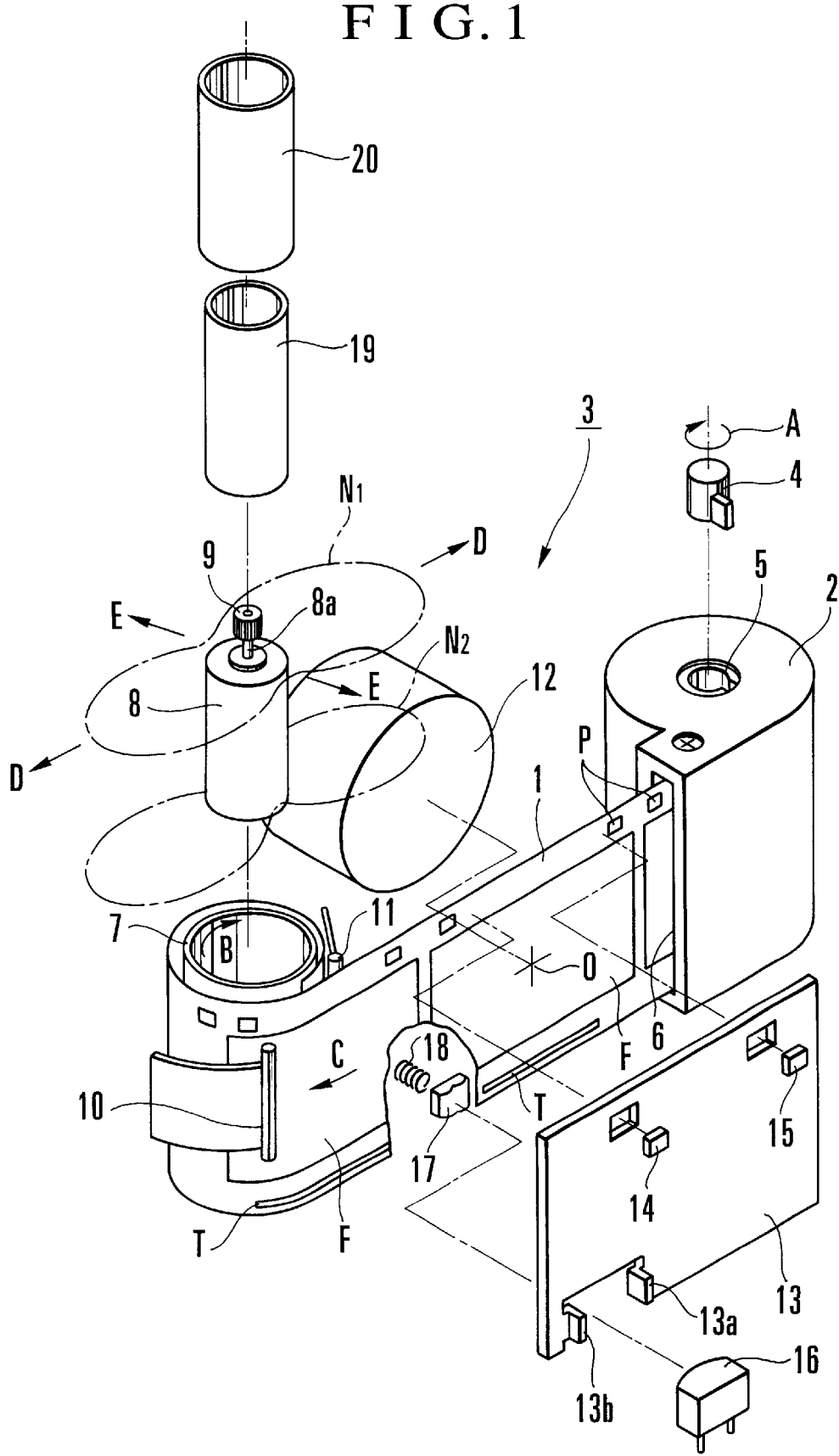
FIG. 1 is an exploded perspective view showing a camera according to a first embodiment of the invention.
Figure 2:
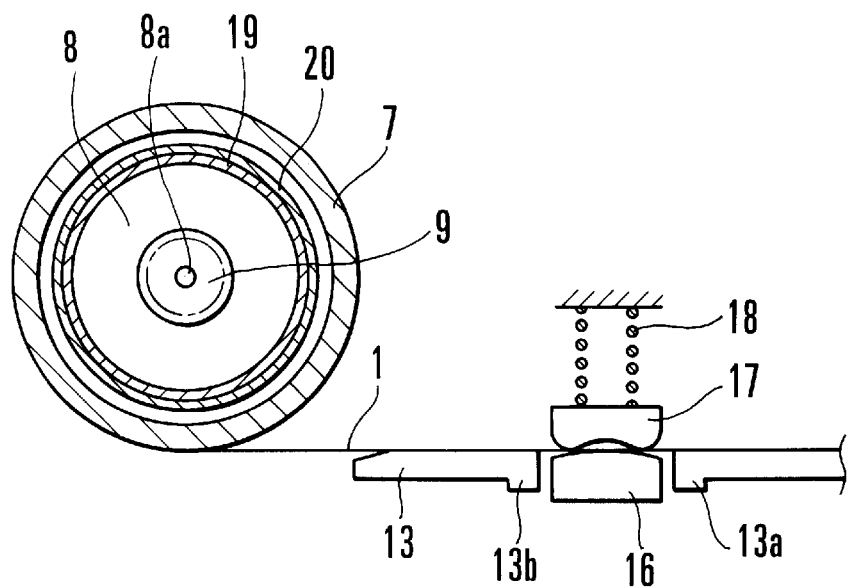
FIG. 2 is a partly sectional plan view showing essential parts of the camera shown in FIG. 1.
Figure 3:
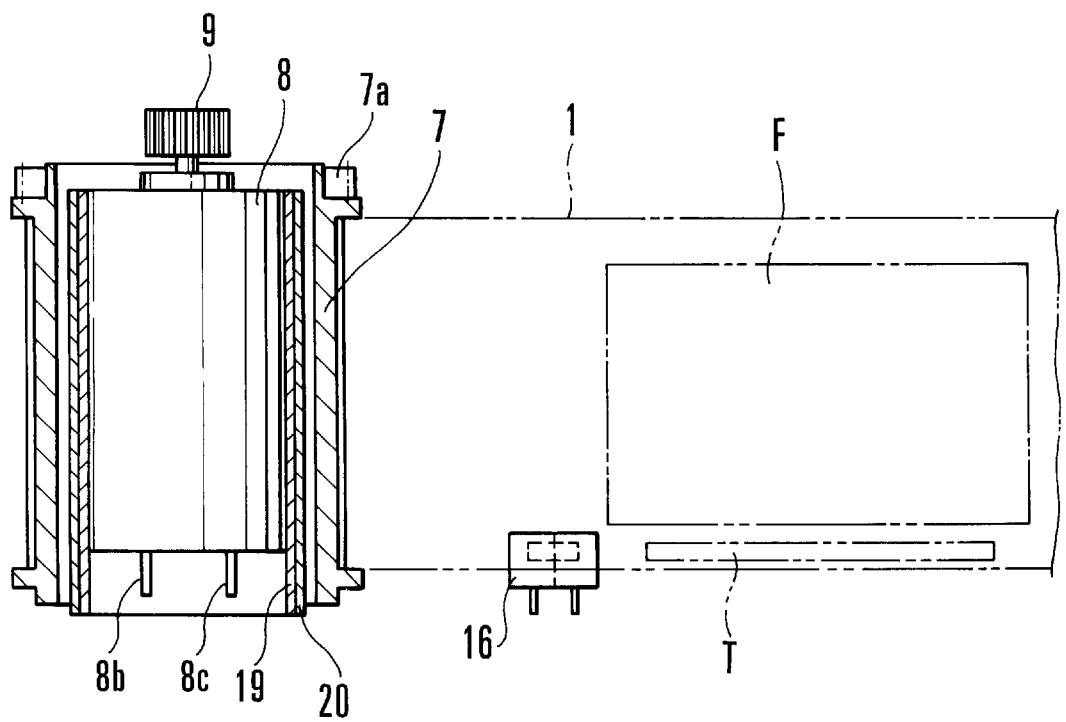
FIG. 3 is a partially sectional rear view showing essential parts of the camera shown in FIG. 1.

FIGS. 1, 2 and 3 show the internal structure of a camera having a magnetic reading device according to a first embodiment of the invention. Referring to FIGS. 1, 2 and 3, a film 1 has a magnetic recording layer formed on the side of its base surface. A film cartridge 2 is arranged to take up and stow the film 1 therein.

When the camera 3 is loaded with the cartridge 2, a spool driver 4 which is arranged in the camera 3 to be driven by a rotating force of a film transport motor 8 rotates in the direction of arrow A. The rotation of the spool driver 4 drives and rotates a spool 5 of the film cartridge 2. The rotation of the cartridge spool 5 then causes the leading end of the film 1 to be thrust out from a film exit port 6 of the film cartridge 2. When the leading end of the film 1 reaches a take-up spool 7 which is disposed inside the camera 3, the film 1 begins to be wound on the take-up spool 7. The start of film winding by the take-up spool 7 causes a known one-way clutch to act to cut off the transmission of the driving force of the motor 8 to the spool driver 4.

The film transport motor 8 is disposed within the take-up spool 7 for reduction in size of the camera 3. A pinion gear 9 is mounted on the output shaft 8a of the film transport motor 8. The rotation of the film transport motor 8 is transmitted to the spool driver 4 through the pinion gear 9, the above-stated one-way clutch, etc., to cause the spool driver 4 to rotate in the direction of arrow A for thrusting the film out from the film cartridge 2. In winding the film by means of the take-up spool 7, the rotation of the film transport motor 8 is transmitted to the take-up spool 7 through the pinion gear 9 and a spool gear 7a which is formed integrally with the take-up spool 7. This causes the take-up spool 7 to rotate in the direction of arrow B.

The film 1 can be rewound back into the film cartridge 2 by reversely rotating the film transport motor 8 to drive and cause the spool driver 4 to rotate reversely to the direction of arrow A.

Guide rollers 10 and 11 are arranged to guide the leading end (leader part) of the film 1 to allow it to be adequately wound around the take-up spool 7. Reference numeral 12 denotes a photo-taking lens. Reference symbol F denotes one of photo-taking frames of the film 1 opposed to the photo-taking lens 12. Reference symbol O denotes the center of the photo-taking frame, i.e., the center of the photo-taking lens 12.

A pressure plate 13 is arranged to secure the flatness of the film 1 by coming into contact with the base surface of the film 1 in taking a shot. Two photo-reflectors 14 and 15 are mounted on the pressure plate 13 at separate positions in the direction of film transport and are arranged to optically detect perforations P of the film 1 while the film 1 is in process of transport.

Figure 4A:
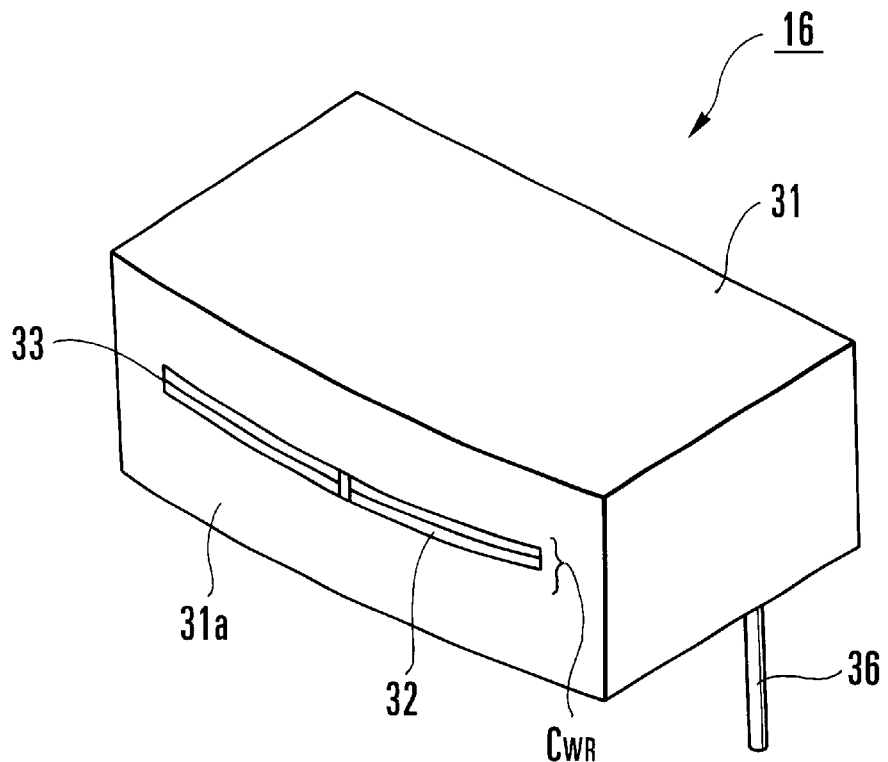
FIGS. 4(*a*) and 4(*b*) respectively show the appearance and the internal structure of a magnetic head of the camera shown in FIG. 1.
Figure 4B:
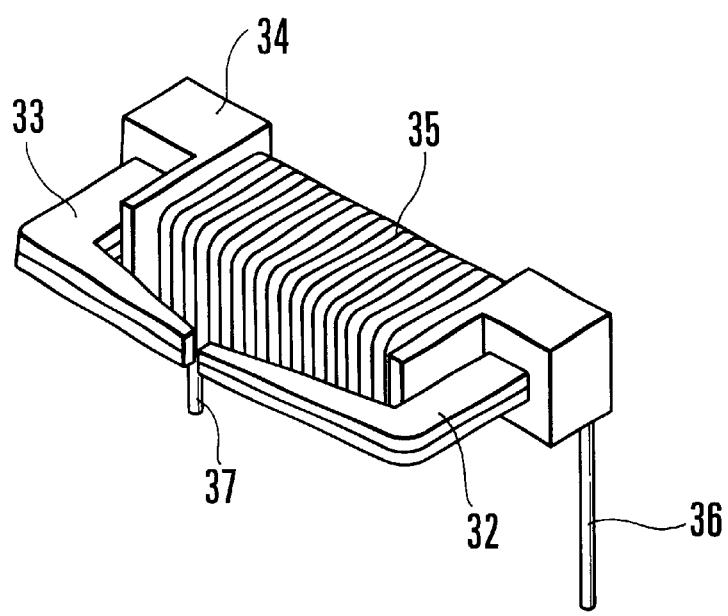

A magnetic head 16 is arranged to magnetically record information on the magnetic recording layer formed on the base surface of the film 1 and to read or reproduce magnetic information recorded on the magnetic recording layer. The magnetic head (magnetic reading means) 16 is configured as shown in FIGS. 4(a) and 4(b). The magnetic head 16 has a combined channel $C_{WR}$ for recording and reproduction. The magnetic head 16 is composed of a pair of cores 32 and 33, a bobbin 34, a coil 35 which is wound around the bobbin 34, and bobbin terminals 36 and 37 which are secured to the bobbin 34 and are connected to the two ends of the coil 35 respectively.

When a current is applied to the bobbin terminals 36 and 37, the magnetic head 16 is enabled to magnetically record information on the film 1. In performing magnetic reproduction, induced voltages generated at the two ends of the coil 35 can be taken out from the bobbin terminals 36 and 37. The bobbin 34 and the coil 35 wound around the bobbin 35 are covered with a shield case 31 which is provided for preventing external magnetic noise from entering the inside of the magnetic head 16. The front surface of the shield case 31 is formed as a sliding contact face 31a for sliding contact with the film 1. The front faces of the cores 32 and 33 which are in the channel $C_{WR}$ are exposed at the sliding contact face 31a. The shield case 31 is made of a soft magnetic material such as permalloy.

The magnetic head 16 which is configured as described above including the shield case 31 is bonded and secured to bent parts 13a and 13b of the pressure plate 13 in such a position as to enable the sliding contact face 31a of the shield case 31 to come into sliding contact with the base surface of the film 1. In FIG. 2, reference numeral 17 denotes a pad member. A pushing spring 18 is arranged to urge the pad member 17 to push the base surface of the film 1 tightly against the sliding contact face 31a of the magnetic head 16.

When the motor 8 is energized after a shot is taken (to make an exposure) for each photo-taking frame, the film 1 is transported in the direction of arrow C to an extent corresponding to one frame. At this time, photo-taking information about each photo-taking frame, such as a date, time, a title, photographic data, etc., is magnetically recorded by the magnetic head 16 through the recording-and-reproduction channel $C_{WR}$ on the magnetic recording layer within an area outside the photo-taking picture plane, in such a way as to form a magnetic track T.

In a case where the camera is loaded with a film cartridge containing a film which has been used (exposed) only halfway and has some of frames still left unexposed, the camera operates as follows. When the film transport motor 8 is energized, the film 1 is thrust out by the spool driver 4. The film 1 is then continuously pulled out by the take-up spool 7 in the direction of arrow C. During this process, the magnetic head 16 reproduces through the recording-and-reproduction channel $C_{WR}$ the photo-taking information recorded in the magnetic track T. The reproduction output of the magnetic head 16 thus obtained is sent to a control circuit (not shown) of the camera 3 to be used for a discrimination between an exposed state and an unexposed state of each of frames, one after another beginning with the leading frame. When an unexposed frame is found, the control circuit acts to cause the frame set at a photo-taking aperture and then causes the process of pulling out the film 1 to come to a stop.

The magnetic reproduction by the magnetic head 16 is performed while the film transport motor 8 is rotating in its energized state. Therefore, the adverse effect of any magnetic noise of the film transport motor 8 on the reproduction output of the magnetic head 16 must be removed. The removal of the adverse effect of magnetic noise cannot be sufficiently attained by the shielding effect of the shield case 31 provided at the magnetic head 16 alone. Besides, the apertures provided in the shield case 31 for the purpose of exposing the cores 32 and 33 make it impossible to completely block the magnetic noise from intruding into the shield case 31.

In view of this, the first embodiment of the invention is arranged to reduce the adverse effect of magnetic noise generated by the film transport motor 8 by setting the magnetic head 16 in a location where it is affected by the magnetic noise to a less degree. In FIG. 1, chain lines N1 and N2 qualitatively indicate the magnitudes of magnetic noise generated by the film transport motor 8. According to what is described in Japanese Laid-Open Patent Application No. HEI 4-22937, the magnetic noise generated by the film transport motor 8 comes to show its maximum value in the directions of arrows D from the rotating shaft 8a of the motor 8 and its minimum value in the directions of arrows E. The magnitude of the magnetic noise little varies in the axial direction of the motor 8. To reduce the adverse effect of magnetic noise of the motor 8, therefore, the magnetic head 16 is located in the directions of arrows E from the motor 8.

In addition to having the magnetic head 16 in the above-stated location, according to the first embodiment, a leak of magnetic flux from the film transport motor 8 is minimized by encompassing the motor 8 with a magnetic shield member. Referring to FIGS. 2 and 3, a first shield member 19 is arranged to encompass the motor 8. A second shield member 20 is arranged to encompass the first shield member 19 to have the motor 8 encompassed further with the second shield member 20. Both the first and second shield members 19 and 20 are provided for preventing the magnetic noise of the motor 8 from entering the inside of the magnetic head 16. The first shield member 19 is made of a silicon steel which is a soft magnetic material. The second shield member 20 is made of a 45% nickel containing permalloy which is also a soft magnetic material.

TABLE 1

|  | saturation magnetic flux density Bs (T) | initial relative permeability $\mu i$ | maximum relative permeability $\mu m$ |
| --- | --- | --- | --- |
| soft magnetic iron | 1.9 | 300 | 8000 |
| 3% silicon steel | 1.9 | 1000 | 30000 |
| 45% nickel permalloy | 1.45 | 5000 | 70000 |
| 78% nickel permalloy | 0.7 | 40000 | 200000 |

Table-1 above shows values of the saturation magnetic flux density and the permeability of typical soft magnetic materials obtained in general. In a case where the magnetic noise is large (high magnetic field), the shield member is made of a material of a higher saturation magnetic flux density. In a case where the magnetic noise is small, the shield member is made of a material having a higher permeability. With the material selected for the shield member in this manner, the magnetic noise of the motor 8 can be effectively blocked. It is important that the shield member has a higher saturation magnetic flux density to be capable of blocking the magnetic noise from leaking to the outside without saturating magnetism in a case where there is a strong magnetic field, like in an area which is in close vicinity to the motor 8. It is also important that the shield member has a high absorbing performance against a high frequency magnetic noise with a higher permeability in an area where the magnetic noise is weakened, like in a peripheral area.

The basic frequency of the magnetic noise generated by the film transport motor 8 while it is rotating is several kHz. Further, since a harmonic component noise must be also removed, the second shield member 20 must have a high permeability within a high frequency zone. According to the values shown in Table-1, the soft magnetic iron and the 78% nickel (containing) permalloy are usable respectively for the first shield member 19 and the second shield member 20.

The magnetic noise thus can be efficiently blocked by arranging a plurality of shield members which are made of different materials around the motor 8 as mentioned above. Therefore, unlike in a case where the motor 8 is shielded with only one shield member made of a single material, a desired effect of shield can be attained without increasing the space required for the shield, i.e., the thickness of the shield member. Further, according to the above-stated shield arrangement of the first embodiment, a magnetic noise which is generated by the motor 8 and has a wide frequency component can be completely blocked.

Further, as shown in FIG. 3, the first and second shield members 19 and 20 are preferably arranged to extend further downward than the terminals 8b and 8c of the film transport motor 8. This is because the lower part of the motor 8 is generally formed with a cap made of a plastic material, which causes magnetic noise to leak in a greater amount than other parts of the motor 8. With the first and second shield members 19 and 20 arranged to extend downward in this manner, the greater amount of leak of the magnetic noise can be effectively prevented from coming toward the magnetic head 16.

Figure 5:
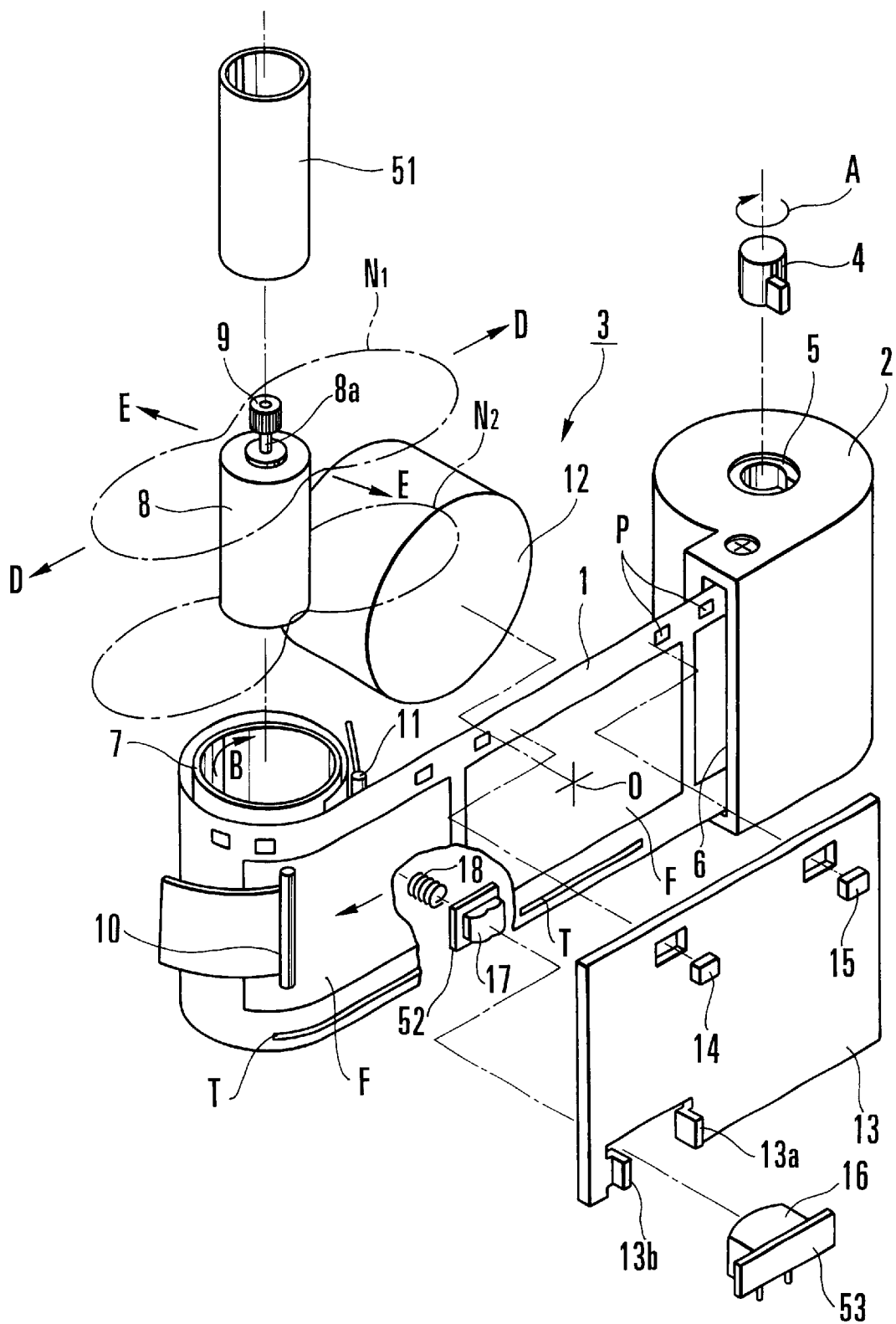
FIG. 5 is an exploded perspective view showing a camera according to a second embodiment of the invention.
Figure 6:
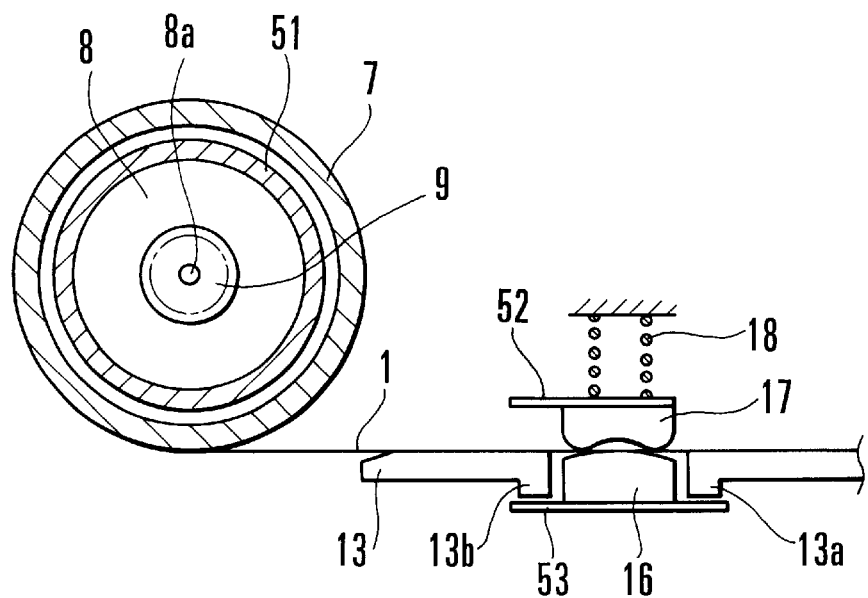
FIG. 6 is a partly sectional plan view showing essential parts of the camera in the second embodiment.
Figure 7:
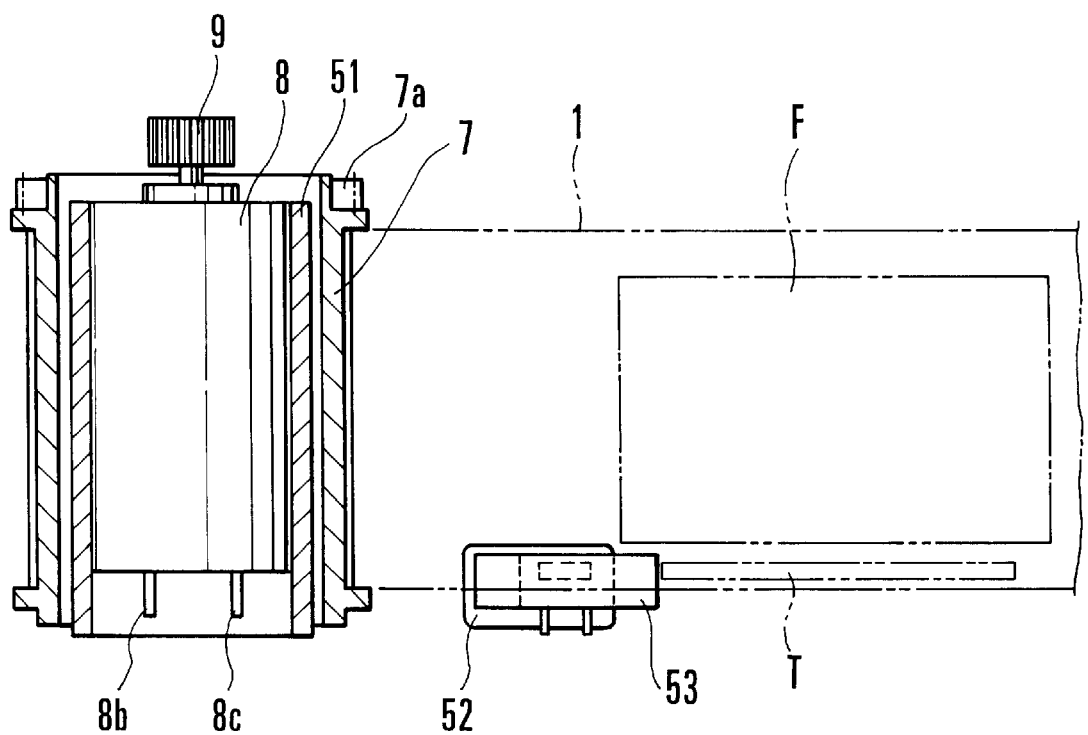
FIG. 7 is a partially sectional rear view showing essential parts of the camera in the second embodiment.

FIGS. 5, 6 and 7 show the internal structure of a camera having a magnetic reading device according to a second embodiment of the invention. The arrangement of the second embodiment is fundamentally the same as that of the first embodiment described above. Therefore, all the elements that are the same as those of the first embodiment are indicated by the same reference numerals as those used for the first embodiment, and the details of them are omitted from the following description. A magnetic head used in the second embodiment is identical with the magnetic head in the first embodiment shown in FIGS. 4(a) and 4(b).

A first shield member 51 which is made of a 45% nickel containing permalloy is mounted to encompass the film transport motor 8. A second shield member 52 which is in a plate-like shape and is made of a 78% nickel containing permalloy is secured to the back side of the pad 17 by bonding or the like. A third shield member 53 which is also in a plate-like shape and is made of the 78% nickel containing permalloy is secured to the back side of the magnetic head 16 by welding or the like.

In the case of the second embodiment, a material having a high saturation magnetic flux density is used for the first shield member 51 which is disposed in a high magnetic field area close to the motor 8. A material having a higher permeability than the material used for the first shield member 51 is used for the second shield member 52 which is disposed close to the magnetic head 16 on its front side and the third shield member 53 which is secured to the rear side of the magnetic head 16. In an area around the magnetic head 16, the intensity of magnetic noise is weakened to a considerable degree by the distance from the motor 8 and by the effect of the first shield member 51. It is, therefore, advantageous to absorb a magnetic noise of a wide frequency band by using a material of a high permeability for the shield in the neighborhood of the magnetic head 16.

In the weakened magnetic noise leaking from the first shield member 51, a noise component coming toward the magnetic head 16 is efficiently and completely absorbed by the second shield member 52 or the third shield member 53 immediately before it reaches the magnetic head 16. Therefore, no induced noise is generated at the magnetic head 16.

The arrangement of encompassing both the front and back sides of the magnetic head 16 with the shield members effectively prevents a non-oriented magnetic noise coming from many directions.

Further, in order to prevent the intrusion of the magnetic noise coming from many directions, it is also preferable that the second and third shield members 52 and 53 have their areas arranged to be as wide as possible.

As shown in FIG. 7, the second shield member 52 is arranged to extend to a shorter extent on its right side for the purpose of preventing it from blocking a photo-taking light flux by interfering with the photo-taking aperture F. However, since the shortened part of the second shield member 52 is located on its side further away from the motor 8, the arrangement does not much incur the adverse effect of magnetic noise.

In the second embodiment, a plurality of shield members made of different materials are arranged near to the film transport motor 8 and near to the magnetic head 16. The arrangement advantageously allows spaces required for the shield members to be dispersed in the neighborhood of the motor 8 and that of the head 16. Compared with a case where shield members are arranged in one place, the camera can be more compactly arranged by virtue of this arrangement which ensures an adequate shielding effect.

As apparent from Table-1, the advantageous effect of the second embodiment described above can be attained likewise by using the soft magnetic iron material or the silicon steel plate material for the first shield member 51 and using the 45% nickel containing permalloy material or the 78% nickel containing permalloy material for the second and third shield members 52 and 53.

The magnetic shield effect can be enhanced by combining the shielding method of the first embodiment and that of the second embodiment with each other. In a third embodiment of the invention, for example, these methods are combined as follows. The first shield member which is made of the soft magnetic iron material or the silicon steel plate material is arranged around the motor 8. The second shield member which is made of the 45% nickel containing permalloy material or the 75% nickel containing permalloy material is arranged around the first shield member. In addition to the first and second shield members, the third shield member made of the 78% nickel containing permalloy material is arranged in the neighborhood of the magnetic head. This arrangement of the third embodiment is advantageous particularly to a case where a film is to be transported by applying a large current to a motor which uses a high performance permanent magnet having a large maximum energy product for the purpose of transporting a film at a very high speed and thus tends to generate an extremely large magnetic noise.

As described above, according to the arrangement of the embodiments described above, a plurality of shield members are arranged to shield a magnetic head from magnetism generated by a motor. The shield members are respectively made of soft magnetic materials of different kinds. The magnetic head, therefore, can be effectively shielded from magnetism by using small shield members.

It is a particularly advantageous feature of the invention that the motor is encompassed with the first shield member which is made of a soft magnetic material of a high saturation magnetic flux density and that the second shield member which is made of a soft magnetic material of a high permeability is arranged either to encompass the first shield member or in the neighborhood of the magnetic head. The magnetic head thus can be effectively shielded from magnetism by the arrangement.

Another advantageous feature of the invention lies in that the arrangement described above permits reduction in size of an apparatus such as a camera adapted for use of a film having a magnetic recording (storing) part.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while the magnetic head in each of the embodiments disclosed is arranged to record and read magnetic information, the invention applies also to a case where a magnetic head is arranged only to record or read. Further, while the embodiments disclosed are arranged to shield the magnetic head from a magnetic noise of a film transporting motor, the invention is likewise applicable to apparatuses arranged to shield magnetic noises of other magnetic noise sources, such as a lens driving motor, a battery loaded on the apparatus, a DC/DC converter, a flash device, etc. Such a modification can be made by just replacing the film transporting motor of the embodiments disclosed with any of these noise sources.

Figure 8:
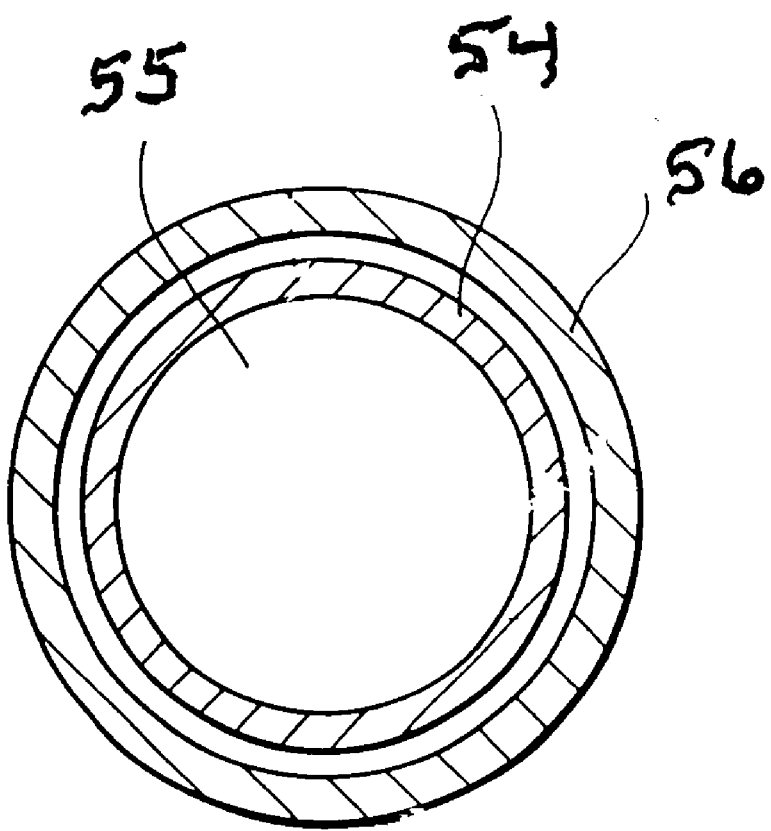
FIG. 8 is a partly sectional plan view showing a battery and a battery compartment shielded in accordance with the invention as a third embodiment thereof.

Referring to FIG. 8, it shows such a third embodiment of the invention wherein a battery compartment includes first shield member 54 encompassing battery 55 and second shield member 56 encompassing shield member 54.

The arrangement of the shield member in each of the embodiments disclosed may be changed as desired.

The invention may be carried out by combining as necessary the embodiments or their technological elements described in the foregoing.

The invention applies to cases where either the whole or a part of claims or the arrangement of each embodiment disclosed forms one apparatus or is used in combination with some other apparatus or as a component element of an apparatus.

Further, the invention is applicable to cameras of varied kinds, such as a single-lens reflex camera, a lens-shutter type camera, etc., a photo-finishing laboratory apparatus, and all apparatuses adapted for films of the kind having magnetic recording parts, such as a photo-video apparatus, a scanner apparatus, etc.

What is claimed is:

1. An apparatus adapted for a film having a magnetic recording part, comprising:

(A) a magnetic head which reads information from the magnetic recording part of the film;

(B) a motor;

(C) a first shield member which shields said magnetic head from magnetic noise generated by said motor, the first shield member surrounding at least part of the motor;

(D) a second shield member which is located at a position to oppose the head with the film being therebetween, said first and second shield members having respective different magnetic shielding characteristics selected in accordance with their respective distances from said motor; and (E) a pad disposed at a position on an opposite side of said magnetic head with the film being therebetween so as to push the film, wherein said second shield member is disposed at a position facing to the film surface and departing from the film pushed by said pad so as not to contact the film.

2. An apparatus according to claim 1, wherein said motor includes a film transporting motor.

3. An apparatus according to claim 1, wherein said first and second shield members are respectively made of soft magnetic materials of different kinds.

4. An apparatus according to claim 1, wherein said first shield member is higher in saturation magnetic flux density than said second shield member.

5. An apparatus according to claim 4, wherein said second shield member is higher in permeability than said first shield member.

6. An apparatus according to claim 1, wherein said second shield member is higher in permeability than said first shield member.

7. An apparatus according to claim 1, further comprising a third shield member disposed on a rear side of said magnetic head.

8. An apparatus according to claim 1, wherein said apparatus includes a camera.

9. An apparatus according to claim 1, wherein said second shield member is provided on a pad facing to the head.

10. An apparatus according to claim 9, wherein said second shield member is provided on a back side of the pad and having a zone extending from the pad toward the motor.

11. An apparatus according to claim 1, wherein said second shield member extends toward the motor.

12. An apparatus according to claim 1, further comprising a third shield member disposed on the head side.

13. An apparatus adapted for a film having a magnetic recording part, comprising:

(A) a magnetic head which reads information from the magnetic recording part of the film;

(B) a battery;

(C) a first shield member which shields said magnetic head from magnetic noise generated by said battery, the first shield member surrounding at least part of the battery;

(D) a second shield member which is located at a position to oppose the head with the film being therebetween, said first and second shield members having respective different magnetic shielding characteristics selected in accordance with their respective distances from said battery; and (E) a pad disposed at a position on an opposite side of said magnetic head with the film being therebetween so as to push the film, wherein said second shield member is disposed at a position facing to the film surface and departing from the film pushed by said pad so as not to contact the film.

14. An apparatus according to claim 13, wherein said first and second shield members are respectively made of soft magnetic materials of different kinds.

15. An apparatus according to claim 13, wherein said first shield member is higher in saturation magnetic flux density than said second shield member.

16. An apparatus according to claim 15, wherein said second shield member is higher in permeability than said first shield member.

17. An apparatus according to claim 13, wherein said second shield member is higher in permeability than said first shield member.

18. An apparatus according to claim 13, further comprising a third shield member disposed on a rear side of said magnetic head.

19. An apparatus according to claim 13, wherein said apparatus includes a camera.

* * * * *